E. VELTUNG.
NON-SKIDDING AND TIRE HOLDING DEVICE FOR PNEUMATIC TIRES.
APPLICATION FILED NOV. 4, 1915.
1,239,749.
Patented Sept. 11, 1917.
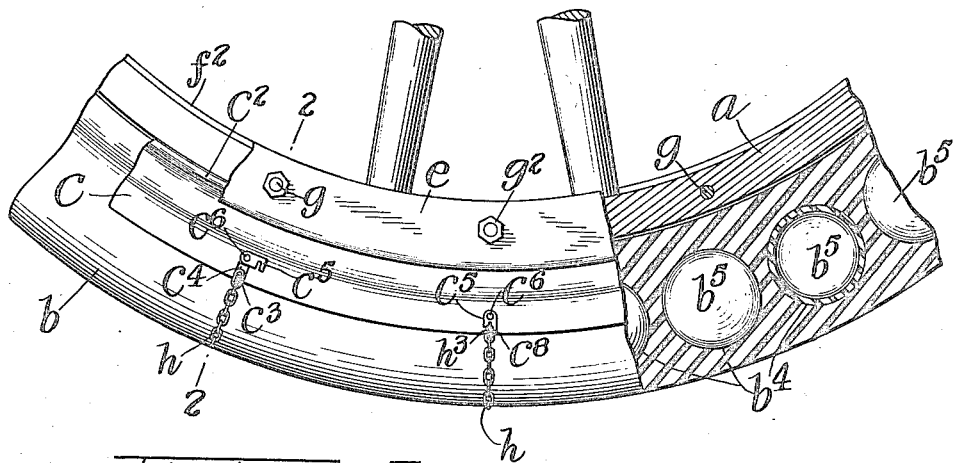
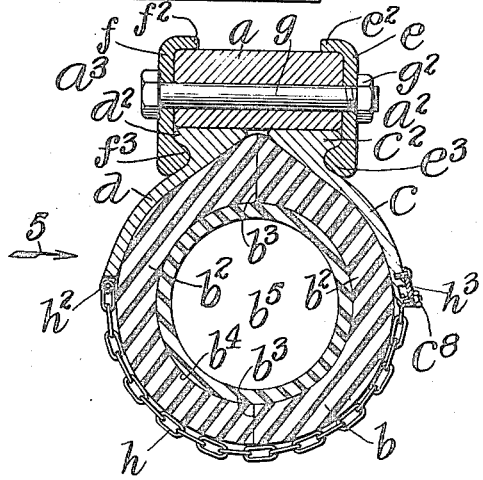
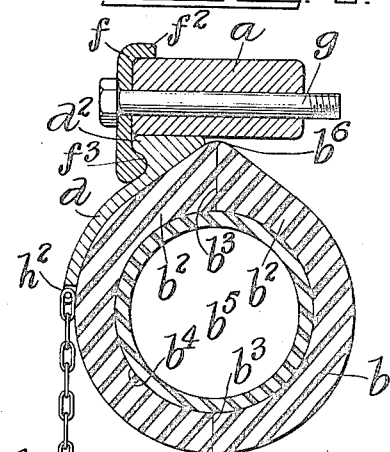
WITNESSES:
H. E. Thompson
C. Mulreany
INVENTOR
Ernest Veltung,
BY
Edgar Tate & Co.
ATTORNEYS

UNITED STATES PATENT OFFICE.

ERNEST VELTUNG, OF NEW YORK, N. Y.

NON-SKIDDING AND TIRE-HOLDING DEVICE FOR PNEUMATIC TIRES.

1,239,749.

Specification of Letters Patent.

Patented Sept. 11, 1917.

Application filed November 4, 1915. Serial No. 59,520.

*To all whom it may concern:*

Be it known that I, ERNEST VELTUNG, a citizen of the United States, and residing at New York, in the county of Bronx and State of New York, have invented certain new and useful Improvements in Non-Skidding and Tire-Holding Devices for Pneumatic Tires, of which the following is a specification, such as will enable those skilled in the art to which it appertains to make and use the same.

This invention relates to cushioned or elastic tires for vehicles of various kinds and classes, and the object thereof is to provide improved means for securing the tire to the rim of a wheel; and a further object being to provide anti-skid devices which are attached to said tire securing means.

The invention is fully disclosed in the following specification, of which the accompanying drawing forms a part, in which the separate parts of my improvement are designated by suitable reference characters in each of the views, and in which:—

Figure 1 is a side view of a part of the rim of a wheel provided with my improvement, part of the construction being shown in section and part broken away;

Fig. 2 a cross section on the line 2—2 of Fig. 1;

Fig. 3 a view similar to Fig. 2 but showing the parts in a different position and with a portion of the parts removed;

Fig. 4 a sectional view similar to Fig. 2 but showing only a detail of the construction and showing the same on an enlarged scale; and, Fig. 5 a side view looking in the direction of the arrow 5 of Fig. 2, and showing only a detail on an enlarged scale with parts in section.

In the drawing forming part of this specification, I have shown at $a$ a rim of a wheel, and said rim may be composed of any material and constructed in any preferred manner, and at $b$ I have shown a tire.

The tire $b$ is composed of rubber, rubber and canvas, or any suitable or similar material or combinations of materials, and said tire is composed of two separate parts $b^2$ connected at $b^3$ by vulcanization or in any other way.

The tire $b$ is provided centrally thereof with spaced spherical chambers $b^4$ in which are placed hollow elastic balls $b^5$ composed of rubber, rubber and canvas, or similar material, and the spherical chambers $b^4$ are formed partly in the inner face of one of the parts $b^2$ and partly in the inner face of the other part $b^2$ and the balls $b^5$ are placed in position, before the separate parts $b^2$ of the tire are connected, as will be readily understood.

In the construction shown, the tire $b$ is not exactly circular in cross section and the inner side thereof is provided with an annular thickened portion $b^6$, but this form of the tire in cross section is not essential and may be modified in any desired manner.

The tire $b$ is secured to the rim $a$ by annular side plates $c$ and $d$ between which said tire fits, and the combined width of the plates $c$ and $d$ is preferably approximately half the circumference of the tire, and for the purpose of this description the side $a^2$ of the rim will be called the outer side of the rim, or wheel, and the side $a^3$ the inner side, and with my improvement the side plate $c$ is preferably made detachable to facilitate the attachment of the tire to the rim, and the detachment of said tire and re-attachment thereof whenever necessary, or the substitution of a new tire for an old one.

The side plates $c$ and $d$ are thickened at their inner edges and provided with laterally directed ribs or flanges $c^2$ and $d^2$ respectively, and annular plates $e$ and $f$ are secured to the sides of the rim and provided at their inner edges with inwardly directed flanges $e^2$ and $f^2$ which overlap the rim on the inner side thereof, and said plates are also provided with inwardly directed annular ribs or projections $e^3$ and $f^3$ which engage the parts $c^2$ and $d^2$ of the plates $c$ and $d$ and lock said parts to the rim, and in the construction shown the plates $e$ and $f$ are secured to the rim by bolts $g$ passed transversely therethrough and provided at their outer ends with nuts $g^2$, and all that is necessary to detach the outer side plate $c$ is to detach the nuts $g^2$ and take off the side plate $c$, after which the tire may be removed or detached, as will be readily understood.

I also provide anti-skidding chains $h$ which, in addition to preventing skidding also aid in holding the tire in connection with the rim of the wheel. These chains are connected with the plate $d$ at $h^2$ in any desired manner, this connection being preferably a permanent connection, and said chains are also connected with the plates $c$ at $h^3$, this connection being a detachable one, and in the operation of detaching the tire the attachment of the chains $h$ at $h^3$ must be broken in which event said chains will be connected with, or suspended from the plate $d$ only and may be re-attached, or connected with the plate $c$ when the tire is replaced.

In the construction shown, the plate $d$ is provided at its outer edge with recesses $d^4$ forming corresponding projecting portions $d^5$ having radial recesses $d^6$, and end links of the chains $h$ are passed into said recesses, and a bolt $d^7$ is passed through the parts $d^5$ and through said links, as shown in Fig. 5, but my invention is not limited to any particular means or method of connecting the chains $h$ with the plate $d$.

The chains $h$ are connected with the plate $c$, in the construction shown, in the following manner. The outer edge of said plate is provided with hook-shaped members $c^3$ around which are recesses $c^4$ and the corresponding end links of the chains $h$ are passed over said hook-shaped members $c^3$ and catches $c^5$ are pivoted to the plate $c$ at $c^6$ and swung into position to cover the recesses $c^4$ and are held in said position by means of screws $c^7$, secured in the parts $c^3$ and provided with thumb nuts $c^8$.

With the construction shown, the plates $c$ and $d$ may both be detached from the tire by removing the bolts $g$, but for ordinary use or purposes, all that is necessary is to detach the plate $c$ and this may be done by removing the nuts $g^2$ from the bolts $g$, and while it must be borne in mind that my invention is not limited to any particular means for securing the plates $c$ and $d$ to the rim $a$ and any suitable devices for this purpose may be employed, and said plates $c$ and $d$ may be of any preferred shape or form in cross section, and various changes in and modifications of the construction herein described may be made, within the scope of the appended claim, without departing from the spirit of my invention or sacrificing its advantages.

From the foregoing description it will be seen that the chains $h$ in addition to serving as anti-skid devices also serve in connection with the annular plates $c$ and $d$ to hold the tire in position on the rim of the wheel, and with my improvement I provide a tire which while it possesses all the qualities of a pneumatic or inflatable tire will be much more durable, and if by any chance the tire and one or more of the balls $b^5$ should be punctured, the operation of the tire will not be materially interfered with, and if desired the outer or bearing portion of the tire may be provided with reinforcing devices in the same manner as other tires of this class to prevent the puncture of the balls $b^5$ and said outer portion of the tire, but while I have shown and described a specific form of tire my invention is not limited thereto as the improved tire securing means and anti-skid devices connected therewith form the subject-matter of this invention, and may be used in connection with tires of any kind or class.

Having fully described my invention, what I claim as new and desire to secure by Letters Patent, is:—

The herein described means for securing an elastic tire to the rim of a wheel and providing anti-skid devices consisting of annular side plates between which the tire is placed, said side plates being adapted to be secured to the rim, chain devices adapted to be passed transversely around the outer surface of the tire, one end of said chain devices being permanently connected with one of said side plates, the other end of said chain devices being detachably connected with the other of said side plates, and lock devices pivoted to said last named side plate and adapted to hold the detachable end of said chain devices against displacement.

In testimony that I claim the foregoing as my invention I have signed my name in presence of the subscribing witnesses this 1st day of November, 1915.

ERNEST VELTUNG.

Witnesses:
MARIE KATIE VELTUNG,
CLARA EDITHE STOLL.